United States Patent
Brown et al.

(10) Patent No.: US 8,409,660 B2
(45) Date of Patent: Apr. 2, 2013

(54) SYSTEMS AND METHODS FOR PROCESSING A MAGNETIC DISK

(75) Inventors: Charles A. Brown, San Jose, CA (US);
John M. Burns, San Jose, CA (US);
Xing-Cai Guo, Tracy, CA (US);
Thomas E. Karis, Aromas, CA (US);
Bruno Marchon, Palo Alto, CA (US)

(73) Assignee: HGST Netherlands, B.V., Amsterdam (NL)

( * ) Notice: Subject to any disclaimer, the term of this patent is extended or adjusted under 35 U.S.C. 154(b) by 673 days.

(21) Appl. No.: 12/426,767

(22) Filed: Apr. 20, 2009

(65) Prior Publication Data
US 2010/0266754 A1    Oct. 21, 2010

(51) Int. Cl.
*B05D 3/12* (2006.01)

(52) U.S. Cl. .............. 427/127; 428/843.3; 428/843.4; 428/843.5

(58) Field of Classification Search .......... 568/677; 427/601; 428/817, 841.3, 843.3, 833.7, 833.4, 428/840.4, 843.5
See application file for complete search history.

(56) References Cited

U.S. PATENT DOCUMENTS

| | | | |
|---|---|---|---|
| 4,642,246 A | 2/1987 | Janssen et al. | |
| 4,797,303 A * | 1/1989 | Frew et al. | 427/131 |
| 5,286,398 A | 2/1994 | Krespan | |
| 5,536,577 A | 7/1996 | Murayama et al. | |
| 5,545,478 A | 8/1996 | Lin et al. | |
| 5,652,204 A | 7/1997 | Cracknell et al. | |
| 5,962,141 A | 10/1999 | Falcone | |
| 6,080,486 A * | 6/2000 | Falcone et al. | 428/421 |
| 6,083,600 A | 7/2000 | Kasai et al. | |
| 6,410,103 B1 | 6/2002 | Kasamatsu et al. | |
| 6,551,703 B1 | 4/2003 | Falcone et al. | |
| 6,761,974 B1 | 7/2004 | Liu et al. | |
| 6,846,542 B1 | 1/2005 | Liu et al. | |
| 6,984,422 B2 | 1/2006 | Liu et al. | |
| 7,276,262 B2 | 10/2007 | Giorgi et al. | |
| 2007/0060487 A1 * | 3/2007 | Burns et al. | 508/582 |
| 2007/0248749 A1 | 10/2007 | Guo et al. | |
| 2008/0176106 A1 | 7/2008 | Guo et al. | |

FOREIGN PATENT DOCUMENTS

JP    2001143253 A1    5/2001

OTHER PUBLICATIONS

Marchon, B. et al, "Fomnlin Multidentate Lubricants for Ultra-Low Magnetic Spacing," IIE Transactions on Magetic, vol. 42, No. 10, Oct. 2006.

(Continued)

*Primary Examiner* — Michael Cleveland
*Assistant Examiner* — Tabassom Tadayyon Eslami
(74) *Attorney, Agent, or Firm* — Duft Bornsen & Fettig, LLP

(57) ABSTRACT

A system and associated methods are described for preparing a magnetic disk for installation within a disk drive system. For example, a polyfunctional lubricant may be mixed with a chemical agent to esterify the polyfunctional lubricant and cap hydroxyl groups of the polyfunctional lubricant. The magnetic disk may then be dip coated with the polyfunctional lubricant and chemical agent mixture. A polishing system then polishes the magnetic disk via an abrasive polishing tape after dip coating the magnetic disk. A portion of the chemical agent is then removed from the magnetic disk to bond a portion of the lubricant to the magnetic disk to prevent the lubricant from interfering with a read/write head when installed within a disk drive system.

14 Claims, 6 Drawing Sheets

OTHER PUBLICATIONS

Hiroshi Chiba et al, "Synthesis of Tri-functional PFPE Lubricant and its Spreading Characteristics on a Hard Disk Surface," Micro-Nanocechatronics and Human Science, 2004 and the Fourth Symposium Micro-Nanomecha.

Homola A Lin et al., "Process for Chemically Bonding Lubricant to Particulate Magnetic Media Surface," IBM Technical Disclosure Bulletin, abstract only, Jul. 1995.

Hiraide et al., "Effects of Lubricants and Their Treatments on Tribological Characteristics of Thin-Film Disks," Tribology Online, 3,2 (2008) pp. 143-147, ISSN 1881-2198.

Tao et al., "Bonding, degradation, and environmental effects on novel perfluoropolyether lubricants," Science Direct, 2005.

* cited by examiner

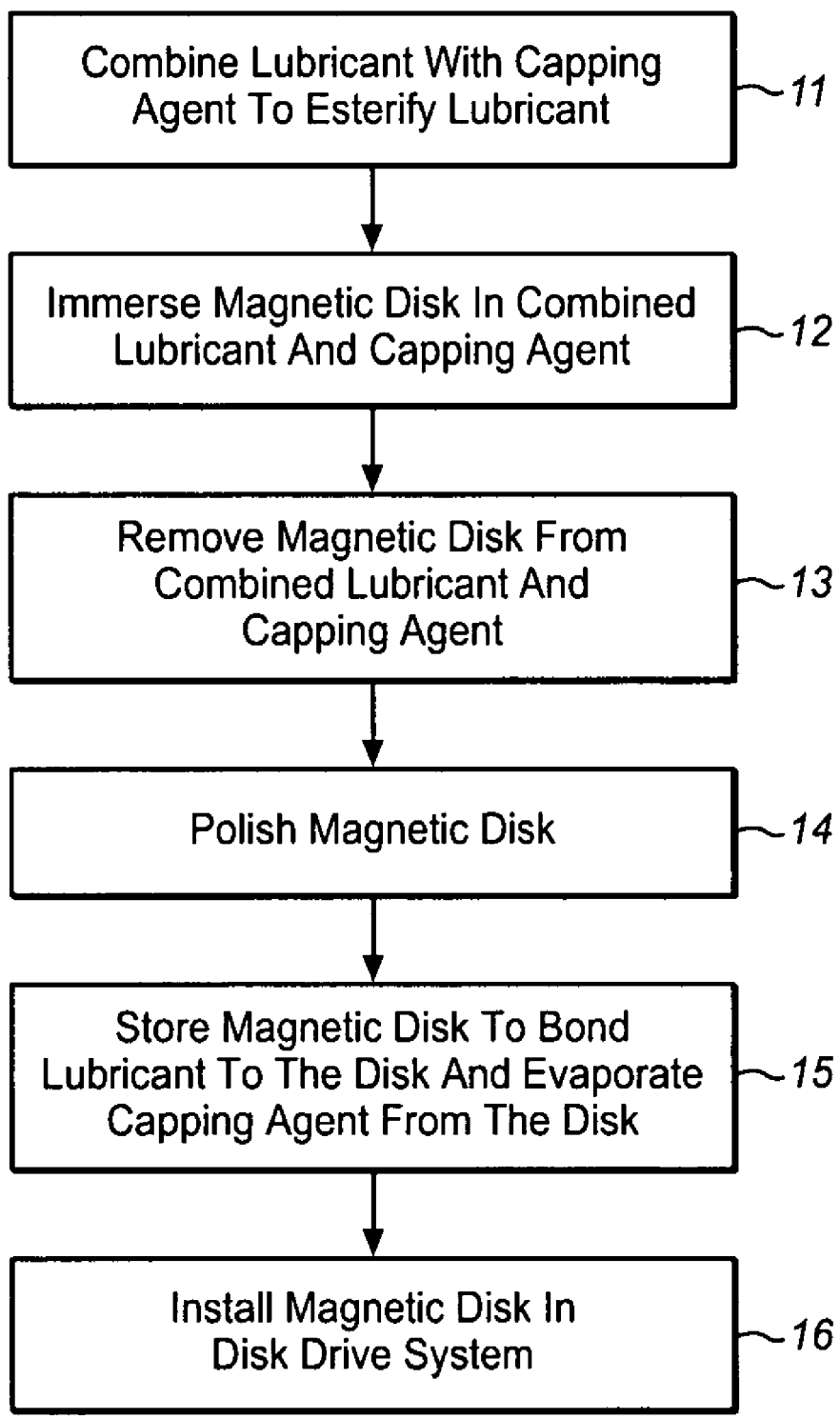

P=1.0atm  T=293 K
dG= -53.4 Kcal LogK=39.831
dH= -18.6 Kcal dS=118.84cal/K

SYSTEMS AND METHODS FOR PROCESSING A MAGNETIC DISK

BACKGROUND OF THE INVENTION

1. Field of the Invention

The invention is related to the field of magnetic disk polishing and, in particular, to reducing burnish damage to magnetic disks caused by polishing pads such that magnetic disk production yield may be increased.

2. Statement of the Problem

Disk drives read and write magnetic flux patterns on rotating magnetic disks. Disk drives have been used for over forty years to store digital data and offer relatively low cost, high recording capacity, and rapid data retrieval. While the basic principle of reading and writing magnetic patterns on rotating disks remains about the same, components of the disk drive, particularly the read/write head and the magnetic disks, have significantly evolved.

The first magnetic disks were made by coating a rigid platter, as large as 24 inches in diameter, with magnetic particles, such as iron oxide particles, mixed in a resin. More recently, thin-film technology has been used to sputter a thin film of magnetic material on a disk. The magnetic film offers much improved magnetization when compared to the older, particulate films, thereby producing magnetic flux from a much thinner film. A thinner film also allows more narrow magnetic cells which represent a data bit to be formed. The narrower magnetic cell results in higher recording and storage densities. The magnetic thin film may be formed on a very smooth disk so as to allow the head to "fly" closer to the magnetic cells, yielding higher read-back amplitudes.

Surface roughness limits how low a head can approach the media and adds to the overall contribution of noise from the magnetic layer. Advancements in the design of recording heads, particularly the introduction of magneto-resistive (MR) heads, have caused the continued reduction in surface roughness of the magnetic disks. Present thin film media have asperities that approach 1 nm or more. In the future, as data densities increase, surface roughness is likely to be an order of magnitude less than that of present magnetic disks. Thus, advances in polishing techniques that remove asperities from the magnetic disks will likely become increasingly important.

Magnetic disk polishing via a polishing pad and polishing tape generally follows sputter deposition of magnetic layers, overcoat, and lubricant dipping. The purpose is to polish relatively high asperities on the disk surface. Polishing is a delicate process that can damage the disk by causing overcoat scratches and loosening solid particles, thereby leading to relatively poor corrosion resistance and/or decreased performance. Often, a small amount of unbonded lubricant is used to minimize polishing damage to the disk. A longer lube-to-polish delay, however, generally increases the bonded fraction of the lubricant to the magnetic disk which can lead to polishing damage to the disk.

However, too much free lubricant can also cause problems, such as lube pick-up by the head and reduced magnetic clearance. The total lubricant thickness, therefore, is often limited to reduce magnetic spacing and achieve higher areal density, thereby rendering the magnetic disk susceptible to damage during polishing. Other attempts at solving the problem are surprisingly complex. For example, in some instances, a lubricating layer is applied to the surface of a thin protective layer on a magnetic disk. Thereafter, the protective layer is polished to remove asperities from the surface thereof. The lubricant layer is then removed by solvent washing and a replacement lubricant layer is deposited on the surface of the protective layer. This multi-step process increases both time and costs for readying the magnetic disks for use in a disk drive.

Accordingly, there exists a need for lubricating the magnetic disks that deters most bonding of the lubricant to the magnetic disk until polishing is complete.

SUMMARY OF THE INVENTION

A polishing system and associated methods are described for polishing a magnetic disk used in a disk drive system. In one embodiment, a method of processing a magnetic disk includes combining a lubricant (e.g., a polyfunctional lubricant such as Z-tetraol multidentate perfluoropolyether) with a capping agent. The capping agent (e.g., an acetate, a carbonate, or silane) is operable to esterify at least a portion of the lubricant. The method also includes immersing the magnetic disk in a bath containing the combined lubricant and capping agent. The magnetic disk is then removed from the bath such that asperities on the magnetic disk can be polished. The method also includes storing the magnetic disk until at least a portion of the capping agent evaporates from the disk (e.g., via heating) and at least a portion of the lubricant bonds to the disk. The method may also include capping hydroxyl groups of the lubricant. For example, combining the lubricant with the capping agent may include mixing the lubricant with the capping agent in predetermined amounts to control capping of the hydroxyl groups of the lubricant.

In another embodiment, a method of preparing a magnetic disk for installation within a disk drive system includes mixing a polyfunctional lubricant with a chemical agent to esterify the polyfunctional lubricant and cap hydroxyl (OH) groups of the polyfunctional lubricant, and dip coating the magnetic disk in the polyfunctional lubricant and chemical agent mixture. The method also includes polishing the magnetic disk via an abrasive polishing tape after dip coating the magnetic disk, and removing at least a portion of the chemical agent from the magnetic disk to bond at least a portion of the lubricant to the magnetic disk.

In another embodiment, a system for processing a magnetic disk includes means for combining a lubricant with an esterification agent to form an esterified lubricant, a bath operable to contain the esterified lubricant for dip coating the magnetic disk with the esterified lubricant, and a polishing system operable to polish asperities on the magnetic disk after dip coating the magnetic disk with the esterified lubricant. The system also includes a means used for bonding at least a portion of the lubricant to the magnetic disk after polishing.

DESCRIPTION OF THE DRAWINGS

The same reference number represents the same element or same type of element on all drawings.

FIG. 1 is a flowchart illustrating a process of lubricating a magnetic disk for processing in one exemplary embodiment of the invention.

DETAILED DESCRIPTION OF THE INVENTION

Figure 2A:
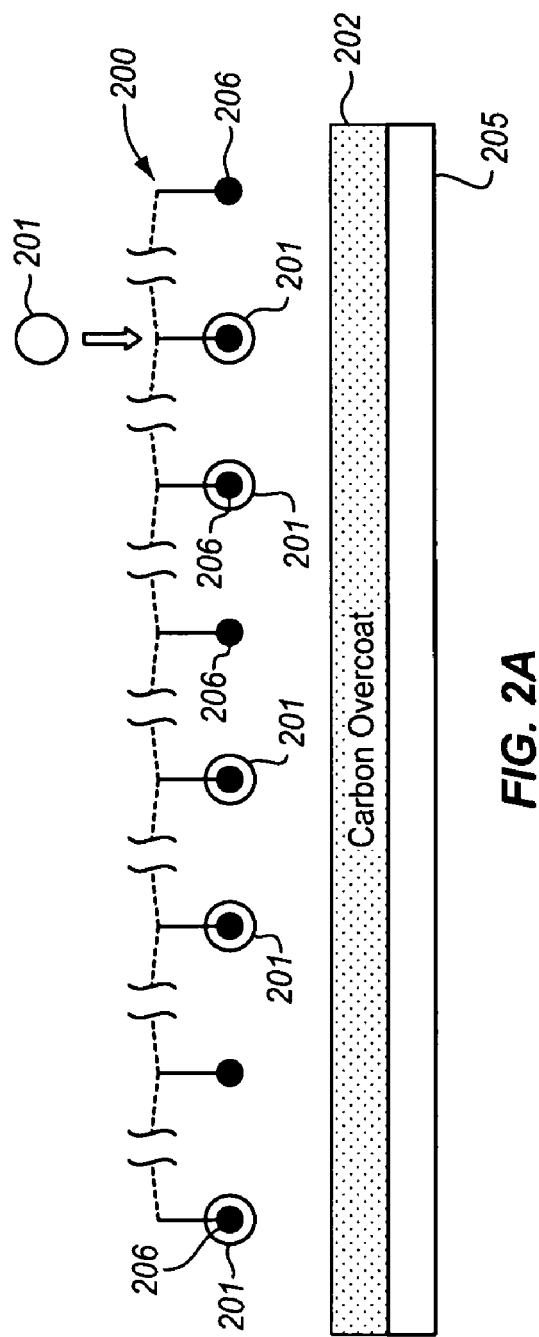
FIGS. 2A and 2B illustrate dip coating of a capped lubricant of the magnetic disk of FIG. 1 in one exemplary embodiment of the invention.

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

FIG. 1 is a flowchart illustrating a process 10 of lubricating a magnetic disk 205 of FIG. 2 for processing in one exemplary embodiment of the invention. The process 10 initiates with the combination of a lubricant 200 and a capping agent 201 in process element 11. The capping agent 201 is used to esterify the lubricant 200 and reduce the level of bonding of the lubricant 200 to the overcoat 202. For example, the lubricant 200 may be a relatively high molecular weight polyfunctional lubricant, such as ZTMD (Z-tetraol Multidentate perfluoropolyether), capable of being esterified with a chemical agent, such as an acetate or a carbonate. In this regard, the capping agent 201 may cap OH groups 206 of the lubricant 200 so as to reduce the bonding of the lubricant 200 to the overcoat 202 at least until the magnetic disk may be polished. With the combined lubricant 200 and capping agent 201 configured, the magnetic disk 205 may be immersed in a bath containing the lubricant/capping agent combination 200/201 to dip coat the magnetic disk 205 with the lubricant/capping agent combination 200/201 in process element 12. Once dip coated, the magnetic disk 205 may be removed from the lubricant/capping agent combination 200/201 in process element 13 such that asperities on the magnetic disk 205 may be polished in process element 14. Once the asperities have been polished from the magnetic disk 205, the magnetic disk 205 may be stored until at least a portion of the capping agent evaporates from the magnetic disk 205 and at least a portion of the lubricant 200 bonds to the overcoat 202 in process element 15. Such storage may include heating the magnetic disk 205 to assist in the evaporation of the capping agent 201. For example, the magnetic disk 205 may be heated to a temperature of about 65° C. for a certain period of time so as to remove a portion of the capping agent 201 from the magnetic disk 205 thus assisting in the bonding of the lubricant 200 to the magnetic disk 205. Thereafter, the magnetic disk 205 may be installed with a disk drive system in process element 16.

Figure 2B:
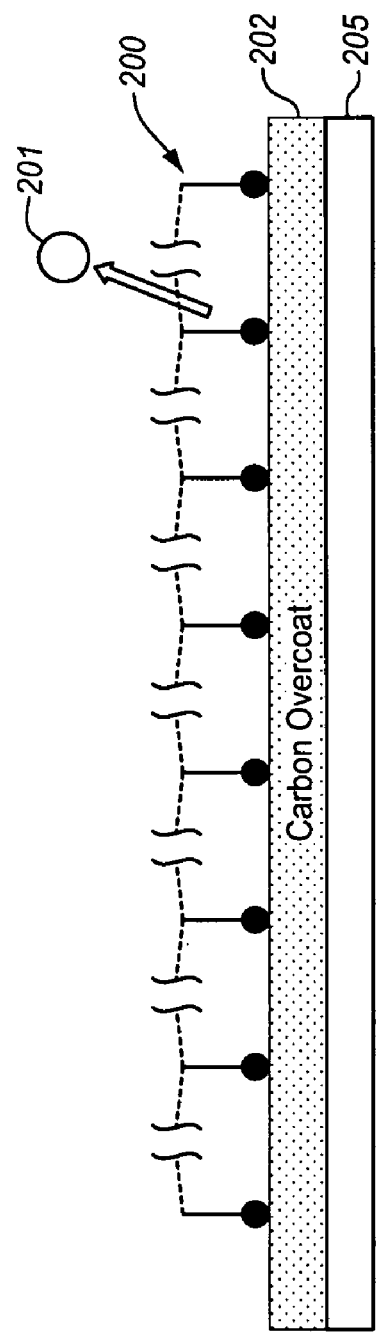
Figure 3:
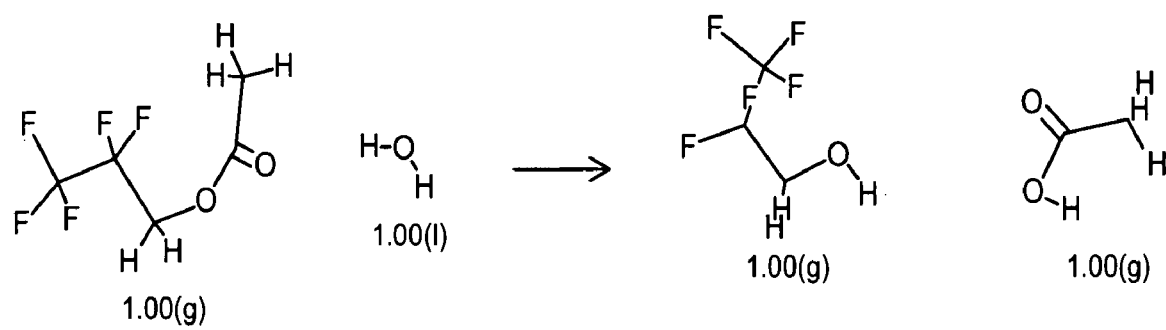
FIG. 3 illustrates exemplary capping group removal via a chemical reaction.

FIGS. 2A and 2B illustrate the dip coating of the lubricant 200 on the magnetic disk 205 in one exemplary embodiment of the invention. A portion of the lubricant 200 may bond to the overcoat 202 after some period of time after the magnetic disk 205 is processed (e.g., polished) and readied for installation within a disk drive system. This bonding delay of the lubricant 200 to the overcoat 202 is useful during disk processing because, among other reasons, bonding of the lubricant 200 to the overcoat 202 generally increases the potential for scratches to the magnetic disk 205 during polishing. However, a certain amount of bonding of the lubricant 200 to the overcoat 202 is useful once the magnetic disk 205 has been processed such that the lubricant 200 does not transfer to a disk drive slider once the magnetic disk 205 has been installed within a disk drive system and placed into operation.

The lubricant 200 may be configured by reacting the end group 206 of a polyfunctional lubricant with a low molecular weight organic function material 201, such as an ester or a carbonate, as shown in FIG. 2A, to "hydroxyl cap" the lubricant 200. One example of a lubricant that may be used in such a reaction includes ZTMD. Because the capping reaction is done on a pure form of the lubricant 200, or pure lubricant 200 dissolved in a suitable solvent, the lubricant 200 may be purified of any byproducts via extraction or other well-known process. The lubricant 200 is then dip coated onto the carbon overcoat 202 of the magnetic disk 205 and processed (e.g., via polishing with the system 700 of FIG. 7). The portion of the lubricant 200 that bonds to the overcoat 202 (i.e., the bonded fraction) may be controlled by temporarily capping functional OH end groups 206 of a polyfunctional perfluoropolyether lubricant, such as ZTMD, via a controlled mole ratio of the capping groups (i.e., the material 201 and the OH groups 206) to the total number of OH groups 206 in the polyfunctional lubricant 200.

Also, a weakly bonded ester or carbonate group may allow bonding of the lubricant 200 to revert to the carbon overcoat 202. For example, entropy and low molecular weight favor evaporation of a low molecular weight ester or carbonate. The overcoat 202 may therefore catalyze the uncapping reaction and facilitate bonding with the overcoat 202. The rate of uncapping may be controlled by the activation energy of the capping bond, the temperature, potential reactive agents present in the environment (e.g., humidity), ions on the surface of the overcoat 202, and/or the chemistry of the overcoat 202 itself. The uncapping rate can be adjusted such that an adequately low level of bonding throughout the magnetic disk processing timeframe is maintained and that a relatively high level of bonding is achieved by the time the magnetic disk 205 is installed in a disk drive system.

Some compounds that may be used to temporarily cap the lubricant's OH groups 206 may form esters with carbonyl chloride or carbonyl anhydride. The use of a chloride requires purification of the lubricant by removing residual chloride ions. Examples of such compounds that form esters with OH end groups 206 of the lubricant 200 include acetyl, hexanoyl, octanoyl chloride or anhydride. Alternatively, ethylcarbonic anhydride may form carbonate hydroxyl groups. Partial formation of a carbonate may keep the lubricant 200 less bonded during polishing. Also, carbonates are generally more labile than esters and, when they break down, tend to liberate materials such as $CO_2$, simple alcohol, and water. Examples of compounds that may form carbonates include dimethyl carbonate, diethyl carbonate, and diethyl pyrocarbonate.

In another embodiment, a portion of the OH groups 206 of the lubricant 200 may be functionalized with a fluorinated chain. A fraction of these functional groups may then be silanized. The total amount of silicon may be relatively small as silyl esters are typically sensitive to the F(−) or HF that is formed when the lubricant 200 degrades. For example, HF may be formed in situ during polishing of the magnetic disk 205. O—Si(Me$_3$) may react with HF to form FSi (Me)$_3$) which is generally volatile. Alternatively, an acetal, such as (—CH(OX)$_2$) or orthoester (≡C(OX)$_3$), where X is chosen from short chain organic groups, may be fluoridated. Acetals and orthoesters are relatively labile in the presence of moisture and a Lewis acid (e.g., HF) or a Bronsted acid (e.g., Al, Co, or other positive ions). Co ions, derived from the magnetic layers, are usually present on the surface of the disk.

The capped groups 201/206 may be removed by having the capping compound 201 degrade in air. Most common catalysts include acids and bases. However, a limited number of acids and bases may be used in the manufacture of magnetic discs. A carbonate, on the other hand, may be removed by a relatively short exposure of magnetic disk 205 to ammonia, methyl amine or a similar nucleophile. Similarly, the magnetic disk 205 may be exposed to a relatively low concentration of acidic vapor such as HF or $BF_3$. Cobalt(+3) is known to be present on the magnetic disk 205 surface and may act as an oxidation catalyst, thereby promoting the oxidative conversion of the capping groups 201.

The entropy term in the free energy may also be exploited by baking the magnetic disk 205 at an elevated temperature to revert the capped moiety to one that is bonded to the carbon overcoat 202. The capped groups 201/206, when configured from a polymeric material, may revert to monomers when the magnetic disk 205 is heated above the ceiling temperature. Alternatively, the capped groups 201/206 may be selected such that the capped moiety reverts to one that is bonded in a reasonable time at ambient conditions in a clean room manufacturing environment (e.g., 20 to 25° C. and 45 to 60% relative humidity).

In another embodiment, Z-tetraol acetate may be formed via the synthesis of Z-tetraol esters. For example, esters may be synthesized by reacting Z-tetraol 1000 with acyl chloride of C2, C6, or C8 alkanoic acid, each of which is manufactured by Sigma-Aldrich Corp in St. Louis, Mo. In this regard, 5 g of each perfluoropolyether may be dissolved in 5 g of DuPont HFE7100 solvent. The acyl chlorides may be added with a 20% molar excess to ensure complete conversion of the OH end groups 206. The acyl chlorides may be added 0.5 g at a time to avoid foaming. The combination may then be mixed with a vortex mixer between each addition. Solvent may then be stripped in a relatively small Kugelrohr (e.g., 60° C. in a mild vacuum, then 110° C. in a vacuum for one hour). This generally results in more than 97% of the OH groups 206 being esterified in the bulk Z-tetraol acetate.

Acylation of the Z-tetraol acetate generally decreases the initial bonded fraction to about half of Z-tetraol 1000. After 21 hours at 65° C., the ester bonded fraction is generally less than about one third of an uncapped lubricant 200. These results are shown in the table below.

| Lube | Thickness | Initial Bonded Fraction | Environment | 21 hours Bonded Fraction |
|---|---|---|---|---|
| Z-tetraol 1000 | 1.38 | 0.34 | ambient 65 C. | 0.39 0.71 |
| Z-tetraol 1000 acetate | 1.35 | 0.18 | ambient 65 C. | 0.20 0.33 |

Specifically, the bonded fraction of Z-tetraol 1000 increases from 0.34 to 0.39 in 21 hours at ambient temperature and to 0.71 in 21 hours at 65° C. The bonded fraction of Z-tetraol 1000 acetate increases from 0.18 to 0.20 in 21 hours at ambient temperature and to 0.33 in 21 hours at 65° C. In another experiment, the bonded fraction of the Z-tetraol 1000 acetate increased from 0.16 to 0.25 in 18 days at ambient temperature and to 0.71 in 18 days at 65° C., thereby illustrating that the bonding of the lubricant may be controllably delayed.

The initial bonded fraction of a polyfunctional lubricant, such as the lubricant 200, may be controlled by adding less than the total molar (i.e., stoichiometric) amount of the end capping species (i.e., the material 201) to leave more reactive end groups available. The reverse bonding, or uncapping, reaction rate can be adjusted by the strength of the bond energy between the capping species and the OH group. This can be achieved chemically, for example, by changing from an acetate to a lower bond strength carbonate, or by steric factors such as changing from an acetate to a tert-butanoate ester.

Other bonding groups may be attached to the bonding sites of the lubricant 200 for the purpose of temporarily controlling the bonding of the lubricant 200 to the magnetic disk 205. However, the bonding process for such groups should be compatible with the materials and processing used in the manufacture of the magnetic recording discs 205. Also, multiple manners may exist for affecting removal of the capped groups 201/206. For example, some methods depend on the bonding group of the lubricant materials and the chemistry of the capping groups. These methods should be compatible with the materials and processing used in manufacturing of the magnetic disk 205. Also, the removal of the capped end groups 201/206 may be controlled to happen at any time between the completion of the magnetic disk manufacturing process and the installation of the magnetic disk 205 within a disk drive system. In one example of the capped group removal, a reaction includes a reversion from the ester. The reaction, illustrated in FIG. 3, may be exothermic and even spontaneous at room temperature.

In another example, acetic anhydride caps the functional OH groups 206 of ZTMD. For example, ZTMD may have a wide range of molecular weight and functionality. Here ZTMD is the reaction product of Z-tetraol 1200 and glycidol. In this case, a purified material, having ionic contaminants removed, is used. Examples of such are shown in the following table:

| | ZTMD (Original) | ZTMD-Ac (Acetate) |
|---|---|---|
| —$(CF_2O)n$— | 5.1 | 5.0 |
| —$(CO\ F_2O)m$— | 5.0 | 4.9 |
| —$CF_2CH_2$—$OCH_2CHOHCH_2O$ | 1.94 | 2.00 |
| (H)-or-Coupled-or-Acetylated $CF_2O/CF_2CF_2O$ | 0.06 | None Detected |
| —$CF_2O/CF_2CF_2O$ | 1.02 | 1.02 |
| Number Average Mw of Z-Backbone | 1240 | 1230 |
| Tetraol/Dol Functionality to Coupling Agent Molar Ratio | 4.00 | 3.96 |

The nominal molecular weight of this ZTMD is 2400 having two OH groups at each end, and four OH end groups in between.

The capping reaction may be performed in 36 grams of Novec HFE 7100 produced by 3M corporation containing 2.5% of ZTMD, approximately two times the molar excess of anhydride. The mixture of ZTMD in HFE is then agitated with a vortex mixer. The 2.5% ZTMD acetate completely dissolves in the HFE-7100 because hydrogen bonding is no longer present. Typically, when about 1 nm of ZTMD is dip coated onto a carbon overcoated thin film magnetic recording disk, such as the magnetic disk 205, the bonded fraction is more than 90% within minutes. This mixture, however, generally contains enough acetic anhydride to cap 59% of the OH groups 206 on the ZTMD, thus decreasing the initial bonded fraction the lubricant 200.

Figure 4:
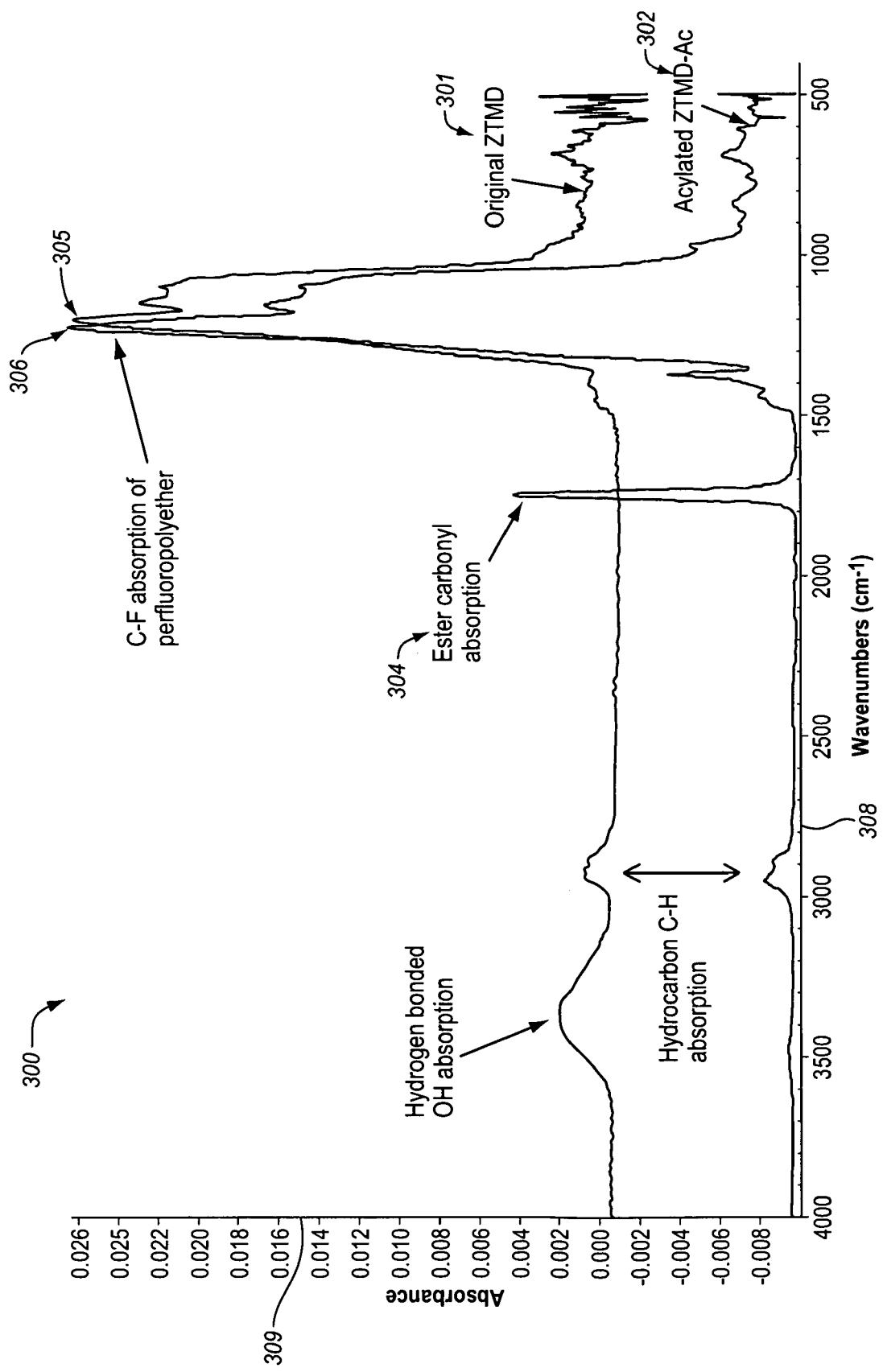
FIG. 4 is a graph comparing ester chemical reaction product capped (acylated) lubricant ZTMD-Ac to the original ZTMD lubricant in one exemplary embodiment of the invention.

FIG. 4 is a graph 300 comparing the acyl ester capped lubricant 200 to the original ZTMD lubricant in one exemplary embodiment of the invention. The applicable family of lubricants includes Zdol 4000, Z-tetraol 2000, and ZTMD acetate illustrated by the following chemical structures:

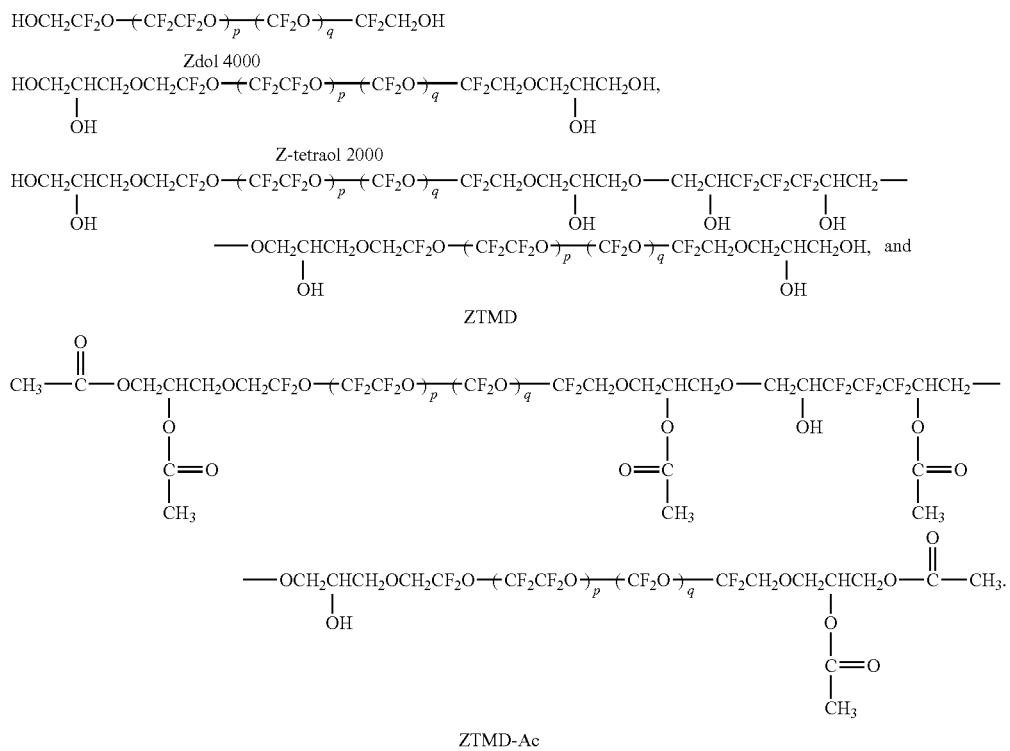

ZTMD-Ac

In each instance, the monomer ratio p/q is approximately equal to one. The ZTMD has the highest number of OH groups 206. The number of OH groups, the molecular weight, and the number average degree of polymerization p+q for these lubricants are shown in the table below.

| Lubricant | Number of OH (Hydroxyl) Groups | Nominal PFPE Segment Molecular Weight | p + q |
|---|---|---|---|
| Zdol 4000 | 2 | 4000 | 16.5 |
| Z-tetraol 2000 | 4 | 2000 | 8.3 |
| ZTMD | 8 | 1000 | 4.1 |
| ZTMD-Ac | 2 | 1000 | 4.1 |

The number of OH groups in ZTMD-Ac is decreased from 8 to 2 by the esterification of ZTMD with acetic anhydride as follows:

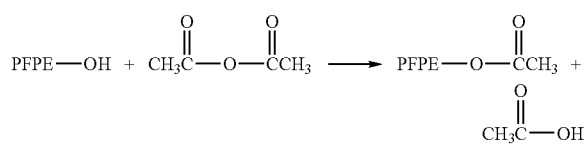

For example, the stoichiometric ratio may be calculated as:

$$\text{stoichiometric ratio} = \frac{\text{acetic anhydride (grams/mol)}/2}{\text{ZTMD (grams/mol)}/8} \text{ (mol/mol)}$$

Since ZTMD nominally contains eight OH groups per chain of ZTMD (mol/mol), $$\frac{102.09 \text{ (grams/mol)}/2}{2400 \text{ (grams/mol)}/8} = 0.17 \frac{\text{grams of acetic anhydride}}{\text{gram of ZTMD}}.$$

The ZTMD acetate ester was synthesized from acetic anhydride in an HFE solvent. In the first experiment, roughly 0.5 grams of ZTMD are then mixed with 20 grams of dried HFE7100 solvent (e.g., dried over a molecular sieve at 3 A). 0.085 grams of acetic anhydride are then added to the mixture creating a stoichiometric ratio 0.1/0.17=0.6. This stoichiometric ratio did not produce a measurable amount of acylation. In a second experiment (entitled "ZTMD AC"), roughly 0.26 grams more of acetic anhydride were added to the mixture, yielding a stoichiometric ratio of 0.36/0.17=2, which formed a clear solution. This mixture was also dip coated onto magnetic disks and measured after certain storage intervals.

Graph 300 illustrates the Fourier Transform Infrared Spectroscopy of ZTMD and ZTMD AC. The graph 300 shows the relative infrared absorbance value (axis 309) across the wavelength spectrum (axis 308). In this regard, each of the chemical lubricant structures (i.e., ZTMD and ZTMD AC of plots 301 and 302 respectively) has a similar C—F peak (i.e., peaks 305 and 306), indicating the lubricant perfluoropolyether chain. The ZTMD AC trace 302, however, illustrates a COO ester carbonyl peak 304 that verifies acylation of the ZTMD, thereby providing a means for controlling the bonding timeframe of the lubricant 200 to the magnetic disk 205. For example, entropy and low molecular weight may cause the timely evaporation of acetic acid hydrolysis product of the acyl ester. The carbon overcoat 202 of the magnetic disk 205 may then catalyze the uncapping reaction and facilitate bonding of the ZTMD with the overcoat 202. As shown above, the ZTMD OH end groups are fully esterified and the internal OH groups are 50% esterified. The ZTMD-Ac is not fully esterified and the internal OH end groups 206 are therefore not fully capped. Since the number of fully capped OH end groups 206 of the ZTMD determines the time in which bonding of the lubricant 200 to the magnetic disk 205 occurs, the bonding delay may be controlled by the stoichiometric ratio of amount of the acetate added to the ZTMD.

Figure 5:
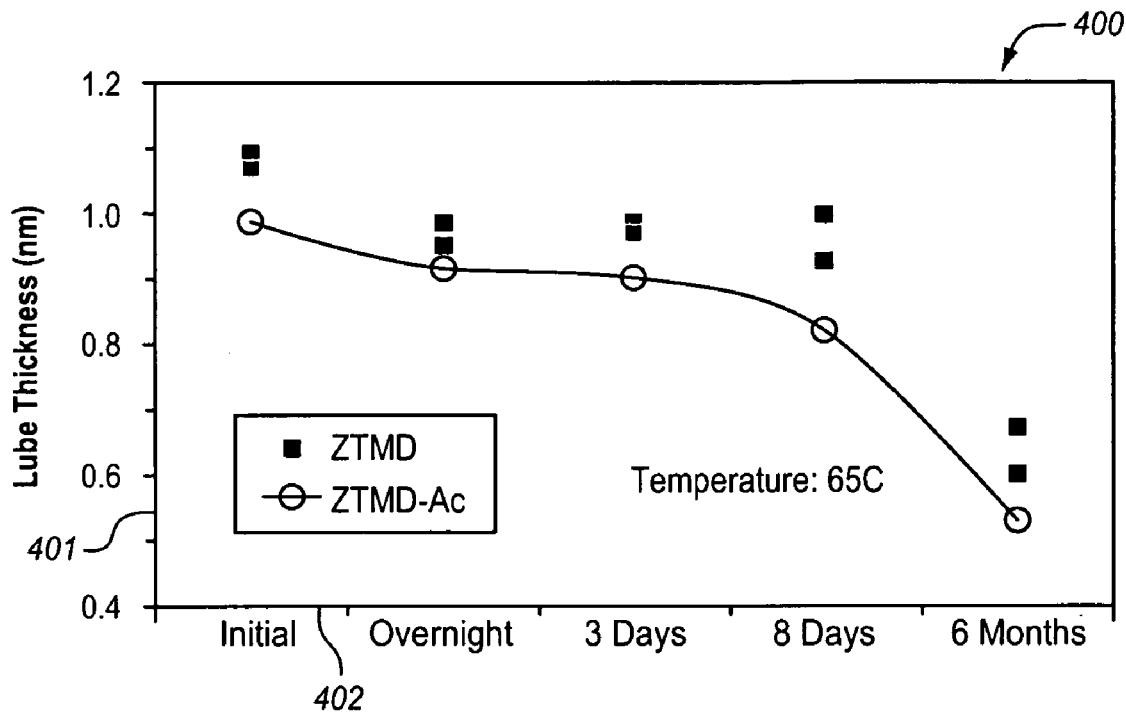
FIG. 5 is a graph comparing lubricant thickness of capped (acylated) lubricant ZTMD-Ac to the original ZTMD lubricant in one exemplary embodiment of the invention.
Figure 6:
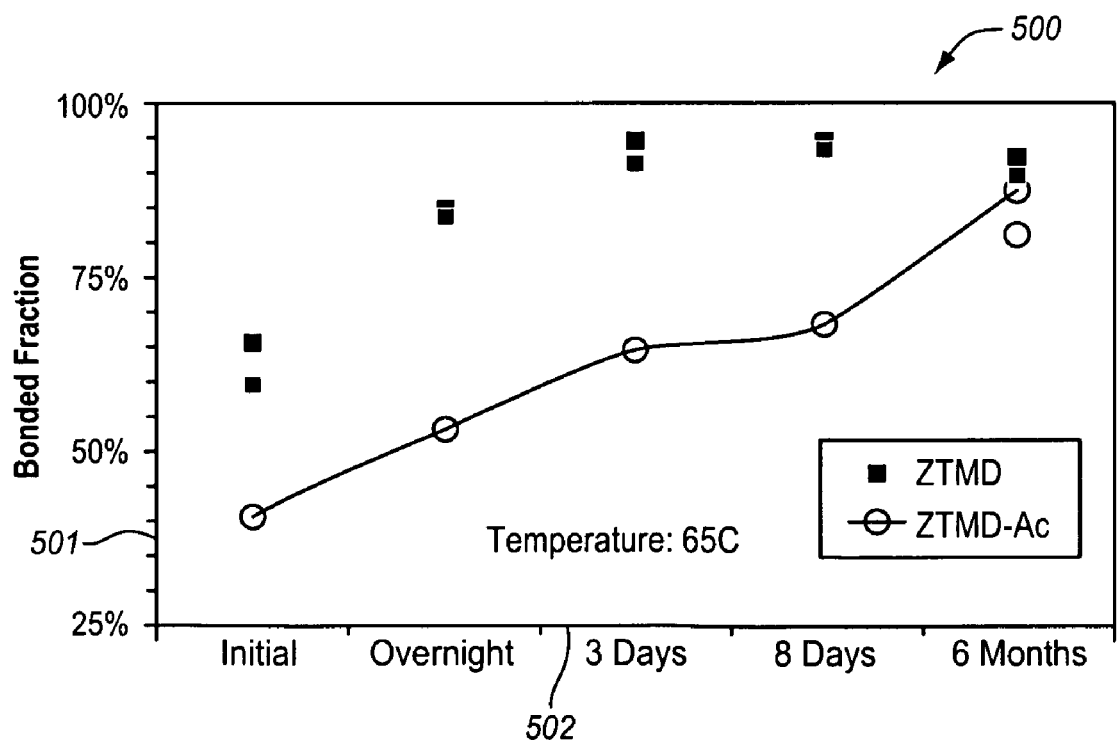
FIG. 6 is a graph comparing the bonded fraction of capped (acylated) lubricant ZTMD-Ac to the original ZTMD lubricant in one exemplary embodiment of the invention.

FIGS. 5 and 6 are graphs 400 and 500 respectively comparing lubricant thickness and bonded fraction of the capped lubricant 200 to the original ZTMD lubricant in one exemplary embodiment of the invention. Graph 400 illustrates lubricant thickness in nm (axis 401) versus time (axis 402) and shows that the lubricant 200 (e.g., ZTMD-Ac), after about 6 months, has a comparable lubricant thickness to the original ZTMD. The diminishing lubrication thickness is advantageous because the lubricant 200 is less likely to interfere with the read/write head when the magnetic disk 205 is installed in a disk drive system. Also advantageous in this regard is the bonded fraction of the lubricant 200, as illustrated in the graph 500 of FIG. 6. After about six months, the lubricant 200 attains a comparable bonded fraction of the lubricant 200 to the magnetic disk 205 (e.g., roughly 90%). This bonded fraction of the lubricant 200 to the magnetic disk 205 is advantageous because it also substantially prevents interference with the read/write head when the magnetic disk 205 is installed in the disk drive system. Different, however, from the ZTMD-Ac and ZTMD lubricants is the initial bonded fraction of the lubricant 200 to the magnetic disk 205. The initial bonded fraction of the lubricant 200 is approximately 40% as compared to the 60% and 65% of the original ZTMD lubricant. This delayed bonding of the lubricant 200 to the magnetic disk 205 means that the magnetic disk 205 is less likely to be damaged during polishing, as described above. That is, the advantageous high bonded fraction of the lubricant 200 to the magnetic disk 205 is delayed until the overcoat 202 can be processed.

Although shown and described with respect to certain amounts of capping agent 201 being mixed with the lubricant 200, the invention is not intended to be limited to any particular combination. Rather, esterifying the lubricant 200 with the capping agent 201 may be performed as a matter of design choice. For example, the time delay between immersing the magnetic disk 205 in the lubricant/capping agent combination 200/201 and the bonding of the lubricant 200 to the overcoat 202 may be controllably varied according to the amounts used in the combination of the capping agent 201 with the lubricant 200. Other factors may also contribute to the evaporation of the capping agent 201 to thereby assist in the bonding of the lubricant 200 to the magnetic disk 205. For example, various combinations of time, heat, and humidity may also assist in the evaporation of the capping agent 201 from the overcoat 202. Nor is the invention intended to be limited to any particular material used for the lubricant 200 as shown and described above. Polyfunctional lubricants other than ZTMD may also be esterified to accomplish the goals of delayed bonding of the lubricant 200 to the overcoat 202 until the magnetic disk 205 may be polished.

Figure 7:
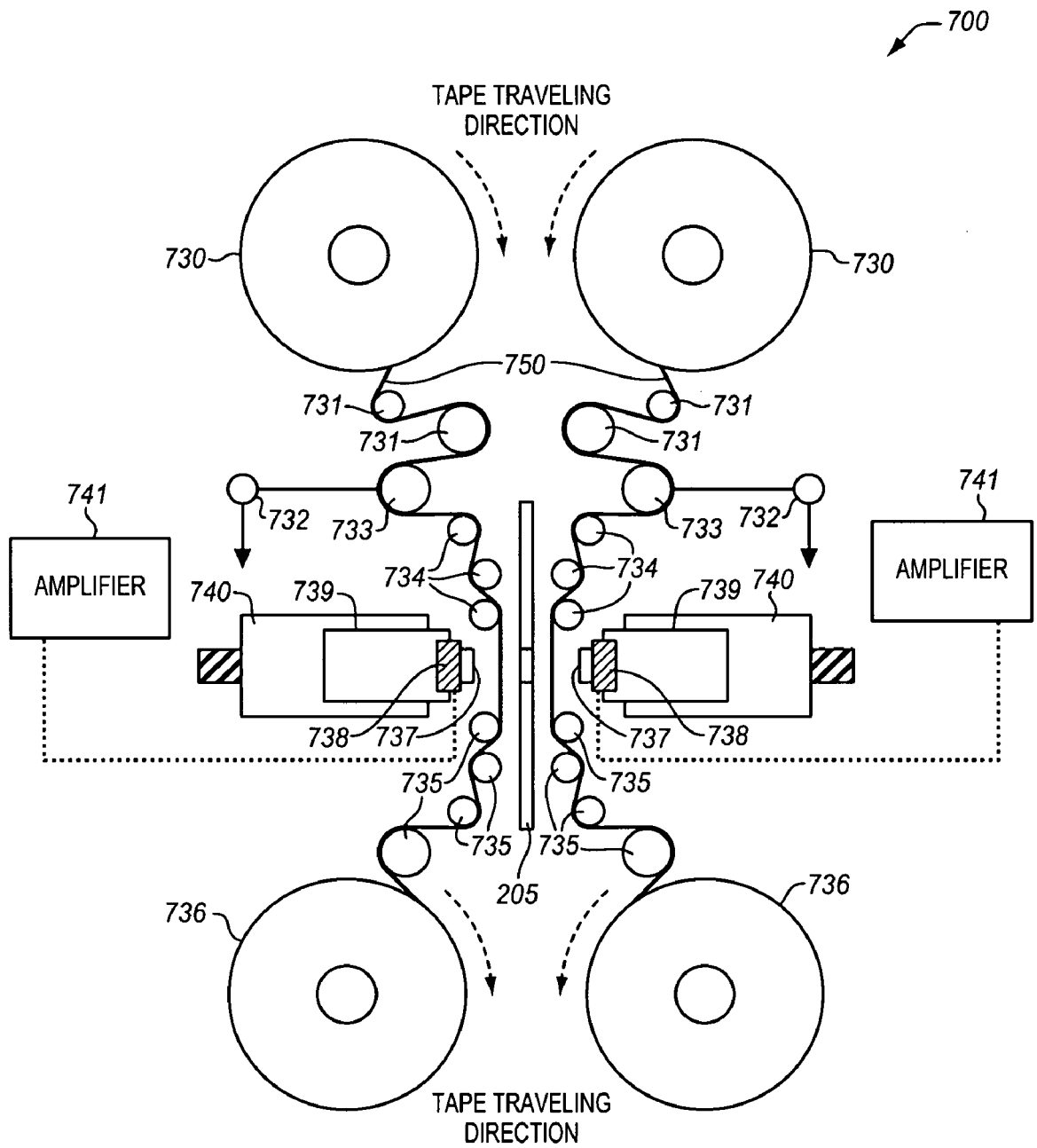
FIG. 7 is a block diagram of a polishing system in one exemplary embodiment of the invention.

FIG. 7 illustrates a system 700 used in removing asperities from the magnetic disk 205. The system 700 includes a pair of mechanisms for polishing both sides of a magnetic disk 205. Each of the mechanisms includes a reel 730, guide rollers 731, a tensioning mechanism 732, guide rollers 734, a pressure mechanism including an elastic polishing pad 737, and a take-up roller 736. The reel 730 feeds a polishing tape 750, such as Mylar configured with a mild abrasive material, wound around the reel 730. The guide rollers 731 guide the polishing tape 750 fed from the reel 730. The tensioning mechanism 732 uses an air cylinder to apply tension to the polishing tape 750 fed between the guide rollers 731 and a guide roller 733. The guide rollers 734 guide the polishing tape 750, to which the tension is applied, onto a surface of the magnetic disk 205. The pressure mechanism including the polishing pad 737 lets the polishing tape 750 slide over the surface of the magnetic disk 205 with a predetermined pressure by pressing the polishing tape 750 onto the surface of the magnetic disk 205 using the polishing pad 737. The take-up roller 736 takes up the polishing tape 750 once it has undergone the polishing process via guide rollers 735.

The system 700 applies pressure to the polishing tapes 750 such that the tapes 750 are brought into contact with the corresponding surfaces of the magnetic disk 205, which is kept rotating. The system 700 thus removes asperities from both sides of the magnetic disk 205 at the same time. For example, when the polishing tape 750 contacts the magnetic disk 205 and the desired pressure is reached, the polishing tape 750 is moved radially from an inner periphery to an outer periphery of the magnetic disk 205. Thus, the entire recording surfaces of the magnetic disk 205 are polished.

The contact pressure of the polishing tape 750 on the magnetic disk 205 surface is controlled by the pressure mechanism that presses the polishing pad 737 against the disk surface at the desired pressure. A base portion, on which the polishing pad 737 is mounted, serves as a strain gage sensor 738. The pressure control is a feedback system. For example, when the polishing pad 737 contacts the magnetic disk 205 via the polishing tape 750, a stress strain is produced in the strain gage sensor 738. A strain output caused by the stress strain is given as a voltage signal to an amplifier 741. The voltage signal is then converted to a corresponding pressure value. A command is then issued to a servomotor so as to maintain the desired pressure. The servomotor may then drive a pressure base portion 740 by way of a ball screw.

To stabilize the pressing force, the strain gage sensor 738 is mounted on a slide mechanism 739 with a low coefficient of friction. At the completion of the polishing sequence, that is, when the tape has left the disk surface on the outer periphery thereof, the polishing tape 750 is fed a distance equivalent to or more than the length of the pad in a longitudinal direction of the tape for each disk.

Although specific embodiments were described herein, the scope of the invention is not limited to those specific embodiments. The scope of the invention is defined by the following claims and any equivalents thereof.

We claim:

1. A method of processing a magnetic disk, the method comprising:
   combining a lubricant with a capping agent, wherein the capping agent esterifies at least a portion of the lubricant;
   immersing the magnetic disk in a bath containing the combined lubricant and capping agent;
   removing the magnetic disk from the bath;
   polishing asperities on the magnetic disk after removing the magnetic disk from the bath; and
   storing the magnetic disk until at least a portion of the capping agent evaporates from the magnetic disk and at least a portion of the lubricant bonds to the disk.

2. The method of claim 1, wherein storing comprises heating the magnetic disk to evaporate at least a portion of the capping agent from the magnetic disk.

3. The method of claim 2, wherein heating the magnetic disk comprises heating the magnetic disk to about 65°Celsius.

4. The method of claim 1, wherein the lubricant is Z-tetraol multidentate perfluoropolyether.

5. The method of claim 1, wherein the capping agent comprises an acetate, a carbonate, or silane.

6. The method of claim 1, wherein combining the lubricant with the capping agent comprises capping hydroxyl groups of the lubricant.

7. The method of claim 6, wherein combining the lubricant with the capping agent comprises mixing the lubricant with the capping agent in predetermined amounts to control capping of the hydroxyl groups of the lubricant.

8. The method of claim 7, wherein a duration for storing the magnetic disk until at least a portion of the capping agent evaporates from the magnetic disk is determined based on a number of capped hydroxyl groups of the lubricant.

9. A method of preparing a magnetic disk for installation within a disk drive system, the method comprising:
   mixing a polyfunctional lubricant with a chemical agent to esterify the polyfunctional lubricant and cap hydroxyl end groups of the polyfunctional lubricant;
   dip coating the magnetic disk in the polyfunctional lubricant and chemical agent mixture;
   polishing the magnetic disk via an abrasive polishing tape after dip coating the magnetic disk; and
   removing at least a portion of the chemical agent from the magnetic disk to bond at least a portion of the lubricant to the magnetic disk.

10. The method of claim 9, wherein removing at least a portion of the chemical agent from the magnetic disk comprises evaporating said at least a portion of the chemical agent from the magnetic disk.

11. The method of claim 10, wherein evaporating said at least a portion of the chemical agent from the magnetic disk comprises heating the magnetic disk to a predetermined temperature based on an amount of the chemical agent in the polyfunctional lubricant and chemical agent mixture.

12. The method of claim 9, wherein the polyfunctional lubricant is Z-tetraol multidentate perfluoropolyether.

13. The method of claim 9, wherein the chemical agent comprises an acetate, a carbonate, or silane.

14. The method of claim 9, wherein mixing the polyfunctional lubricant with the chemical agent comprises combining the polyfunctional lubricant with the chemical agent in predetermined amounts to control capping of the hydroxyl groups of the polyfunctional lubricant.

* * * * *